July 9, 1929.

A. P. WIEGAND 1,719,953

REVERSIBLE BLADE PROPELLER

Filed Sept. 6, 1927

2 Sheets-Sheet 1

Albert P. Wiegand
Inventor
by Smith and Freeman
Attorneys

July 9, 1929.  A. P. WIEGAND  1,719,953
REVERSIBLE BLADE PROPELLER
Filed Sept. 6, 1927  2 Sheets-Sheet 2
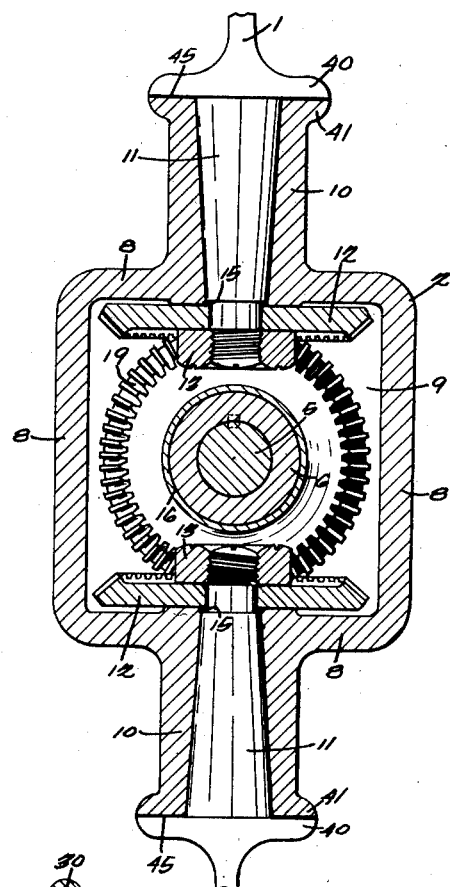
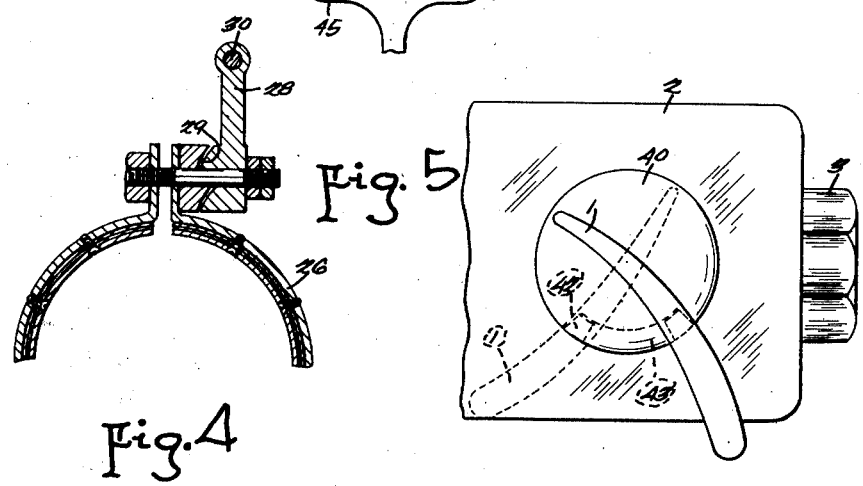
Albert P. Wiegand
Inventor
by Smith and Freeman
Attorneys Patented July 9, 1929.

1,719,953

UNITED STATES PATENT OFFICE.

ALBERT P. WIEGAND, OF CRAFTON, PENNSYLVANIA.

REVERSIBLE-BLADE PROPELLER.

Application filed September 6, 1927. Serial No. 217,567.

This invention relates to aerial navigation and has for its object the provision of means for applying a brake to the forward movement of aeroplanes, dirigibles, and other flying craft. This object is effected by the use of certain improvements in the propeller whereby the angle of the blades can be reversed. Subsidiary objects of the invention are the provision of a propeller construction whereby the reversal of the blades can be effected with a minimum of mechanism; whereby the propeller shall possess an adequate amount of strength and simplicity despite the reversing features; whereby the reversal can be effected only at minimum speeds; and whereby the reversing mechanism is entirely contained within the propeller hub without involving any other modifications in the propelling mechanism. Further objects of the invention will become apparent as the description proceeds.

Figure 1:
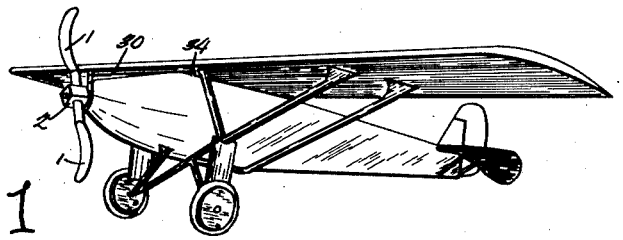
Figure 2:
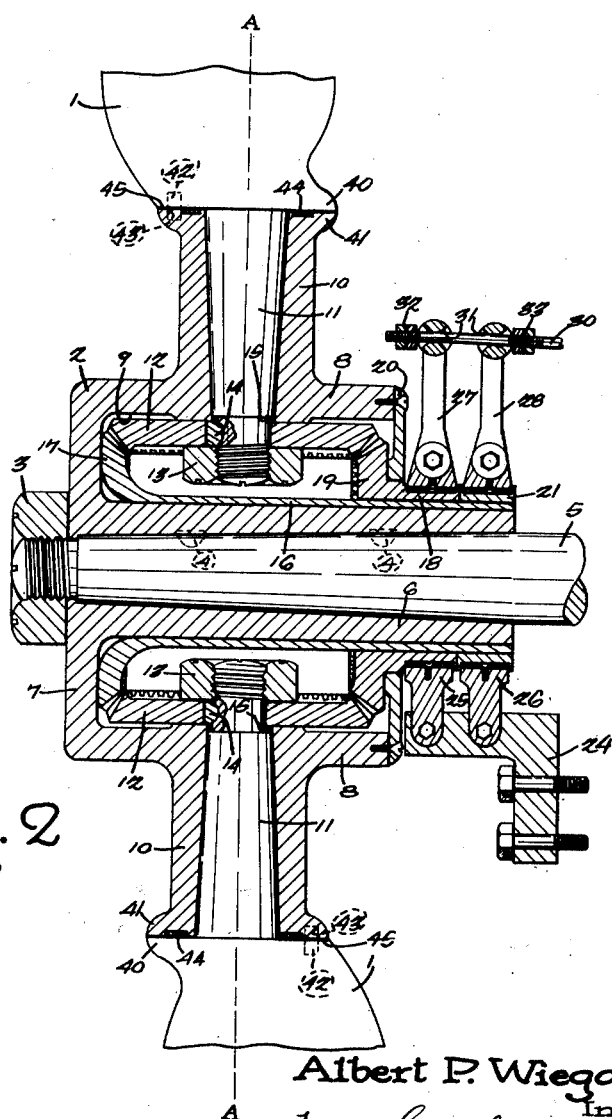

In the drawings accompanying and forming a part of this application I have shown a simple and preferred embodiment of my invention. Fig. 1 is a perspective view of a simple type of aeroplane containing my improvements; Fig. 2 is a longitudinal sectional view through a propeller hub and a portion of the propeller blades showing my invention; Fig. 3 is a sectional view taken at right angles to the parts shown in Fig. 2; Fig. 4 is a detail view of the brake band; and Fig. 5 is a top plan view showing the two positions of the blade.

I have shown a propeller having two blades 1—1 and a hub 2, the latter secured by a nut 3 and keys 4—4 to a tapered engine shaft 5. The hub comprises an inner sleeve 6 closely receiving the shaft and integrally connected by the web 7 at its outer end with the approximately rectangular outer wall 8 defining the gear chamber 9. Projecting radially outward from two opposite faces of the wall 8—8 are the sleeves 10—10 in which are rotatably journaled the shanks 11—11 of the blades 1—1 respectively. Each of these shanks and also the interior of the corresponding sleeve is preferably tapered and caused to fit tightly yet rotatably, the inner end of each shank being provided with a bevel gear 12 tightly secured in any suitable manner as by the nut 13 and keys 14. In order to assist in maintaining tightness I have also shown the shank as shouldered adjacent to the gear for the reception of an interposed compressible gasket 15. Shims can be provided as at 45 to adjust the friction effect.

Rotatably journaled upon the exterior of the sleeve 6 is the tubular hub 16 of a bevel gear 17 which meshes with both gears 12—12; and independently sleeved upon the exterior of the hub 16 is the hub 18 of another bevel gear 19 which also meshes with both the gears 12—12. The last named gear is held in place and the gear chamber is closed by a fixed plate 20 secured to the rear margin of the wall 8—8. Both the hubs 16 and 18 project outside of this plate, the hub 16 to a greater distance than the hub 18, and to the exterior of the hub 16 is tightly affixed an external cylindrical collar 21 of the same external diameter as the hub 18.

Secured to a rigid portion of the engine or craft is a rigid bracket 24 to which are affixed two suitable brake-bands 25 and 26, respectively, and with these are associated two independently operable constricting devices such as the levers 27—28, respectively, which in the present case act upon the respective brake-bands through the agency of cam faces 29. Means are provided for actuating these levers independently so as to constrict one brake-band or the other selectively. With the shaft 5 rotating continuously in one direction the normal tendency is for the gears 17 and 19 to revolve evenly therewith and without any rotation of the gears 12—12, but any arresting of the rotation of either of the gears 17 or 19 immediately produces a rotating tendency upon the gears 12—12 which can be employed to change the angle of the propeller blades. In the present embodiment the free ends of the levers 27—28 are apertured as at 31 for the reception of the forward end of the rod 30 which is provided with adjustable stops 32 and 33 adjacent to the levers 27 and 28 respectively. The rear end of the rod 30 projects into convenient reach from the pilot's seat where it is provided with a suitable handle 34. It is assumed that the cams 29 of the two levers are so disposed that the band 25 will be constricted by a rearward movement of the lever 27 and the band 26 will be constricted by a forward movement of the lever 28. In case the rod be pushed or pulled unduly long no harm can be done since the hub of the gear merely slips against the brake lining.

Each of the propeller blades is formed adjacent to the shank 11 with a circular flange 40 which overlaps a similar flange 41 formed at the end of the sleeve 10 and the adjacent faces of these flanges are provided, the one with a projection 42 and the other with an arcuate slot 43 in which said projection moves. By making this stop adjustable in position, or by varying the length of the slot, it will be obvious that the turning movement of the blade can be arrested at any desired point, although in practice this is chosen once for all and preferably made without adjustability. I have also shown the flange 41 as recessed for the reception of the corrugated friction washers 44 which further tends to hold the propeller blades in any position which they are set.

However, preferably each blade is made asymmetrical about the longitudinal axis A—A of the shank, so that the pressure of the air against the same may at all times hold the stop tightly against the end of the slot 43, thus avoiding all strain on the mechanism and insuring against accidental reversal, and preventing even a voluntary reversal by the operator excepting at minimum engine speeds. Of course each propeller blade is curved laterally according to the design and pattern found to be most efficacious for the speed intended, and the arrangement is such as to employ this curvature during the forward motion which occurs predominantly. When the blade is reversed as shown in dotted lines in Fig. 5, the action of the propeller is substantially less efficient because the curvature is now fully incorrect yet its effect is still sufficient to afford the operator an increased measure of control, and chiefly to effect a landing in a very much smaller space than otherwise, as well as avoiding somersaulting when landing is effected on adverse terrain.

It will be understood that many changes in detail can be made within the scope of my invention, and that too many other uses exist for such a device to thus enumerate.

Having thus described my invention what I claim is:

1. A propeller for the purpose stated comprising blades and a hub, said hub having annularly spaced inner and outer sleeves and sockets carried by said outer sleeve and said blades having shanks pivoted in said sockets, gears carried by said shanks respectively between said sleeves, two bevel gears surrounding said inner sleeve and meshing with said first gears for connecting said shanks rotatively together, coaxial sleeves journaled one within the other surrounding the inner sleeve of said hub and connected one to each of said bevel gears, and means including friction provisions for retarding the rotation of said sleeves selectively relative to said hub during the rotation of said hub.

2. A reversible blade propeller comprising a hub and blades pivoted thereto on radial axes, a bevel gear rigid with each blade, two bevel pinions coaxial with said hub and with each other and rotatable relatively to said hub and to each other and meshing with said bevel gears, and friction means selectively applicable to said bevel pinions during the rotation of said hub to rotate said gears in one direction or the other.

3. A reversible blade propeller comprising a hub and blades pivoted thereto on radial axes, each blade being asymmetrical with respect to its pivot axis, means for arresting the pivot movement of said blades at positions of opposite inclination, a bevel gear rigid with each blade, two bevel pinions coaxial with said hub and with each other and rotatable relatively to said hub and to each other and meshing with said bevel gears, and friction means selectively applicable to said bevel pinions during the rotation of said hub to rotate said gears in one direction or the other.

4. A reversible blade propeller comprising a hub and blades pivoted thereto on radial axes, a gear rigid with each blade, two rotatable members carried by said hub and having friction surfaces formed as surfaces of revolution concentric therewith, gear connections between said members and said first gears whereby rotation of said members relative to the hub shall turn said gears in one direction or the other, and brake means adapted to be applied to said surfaces selectively.

5. A reversible blade propeller comprising a hub and blades pivoted thereto on radial axes, said hub having an internal sleeve and an external wall spaced from said sleeve to define a gear chamber, said outer wall having radial sockets in which said blades are pivoted, bevel gears secured to the shanks of said blades inside said gear chambers, pinions journaled on said sleeve and meshing with said gears, and braking devices adapted to engage the hubs of said pinions.

In testimony whereof I hereunto affix my signature.

ALBERT P. WIEGAND.